Nov. 24, 1925.

G. A. BERRY 1,563,066

PROCESS OF FEEDING SOLIDS OR SEMISOLIDS TO CHEMICAL APPARATUS

Filed Aug. 9, 1920

Inventor
George A. Berry
By his Attorney
Jas. H. Griffin

Patented Nov. 24, 1925.

1,563,066

UNITED STATES PATENT OFFICE.

GEORGE A. BERRY, OF SOMERVILLE, NEW JERSEY.

PROCESS OF FEEDING SOLIDS OR SEMISOLIDS TO CHEMICAL APPARATUS.

Application filed August 9, 1920. Serial No. 402,167.

*To all whom it may concern:*

Be it known that I, GEORGE A. BERRY, a citizen of the United States, residing at Somerville, county of Somerset, and State of New Jersey, have invented a certain new and useful Process of Feeding Solids or Semisolids to Chemical Apparatus, of which the following is a specification.

This invention, broadly speaking, relates to chemical apparatus, and is directed, more particularly, to a process whereby solids, semisolids, or a mixture thereof may be fed through the employment of a liquid or a combination of liquids into a receptacle. The invention is of broad utility in the feeding of solids or semisolids to closed containers in which vapors are being generated since, when the present invention is practiced in conjunction with such containers, the loss or escape of vapors through the feed opening of the container is precluded.

In apparatus used for carrying out various chemical operations, it not infrequently occurs that the apparatus embodies a vessel or chamber in which the desired chemical reaction is caused to take place, such vessels being usually sealed to preclude the free loss of gases or vapors generated incident to the chemical operation or operations. Moreover, in the carrying out of chemical processes, it is often necessary from time to time to add to the contents of the vessel, certain agents, re-agents or catalysts, in order to effect the chemical reaction or transformation desired. For example, in apparatus used in the reduction of nitro compounds to produce certain amino compounds, such as aniline, toluidine, xylidine, etc., the nitro compounds operated upon are placed in a closed vessel, or digester, heated in any suitable manner, and it is necessary from time to time, or continuously, to introduce into the vessel, iron in some form or other, usually as filings, borings, turnings, shavings, or other convenient form. A normally sealed or closed vessel has generally been employed in practicing the process, and the iron has usually been introduced through a funnel-shaped opening, positioned in the cover of the chamber, which funnel shaped opening is usually closed by a tapered wooden plug or stopper to preclude the escape of the vapors or gases which are frequently of a poisonous nature. However, when the plug is temporarily removed, to allow of the introduction of the iron, the vapors, being generated, which are, in many cases, injurious to health, escape, thereby not only endangering the health of the attendants, but, furthermore, occasioning the loss of certain chemical constituents, which it is preferred to retain within the digester. It is manifest that the manner of feeding described is crude, unsanitary and inefficient. Moreover, the escaping vapors tend to gum or cause adhesion among the iron particles thereby preventing their free flow or feed.

The object of the present invention is to evolve a method of delivering iron or other solids or semisolids, or a mixture of both, to the digester or other treatment chamber of a chemical apparatus in such manner that the escape of vapors will be avoided and that the iron or other solids or semisolids may be fed intermittently or continuously in measured quantities at a regulated rate of speed.

In one practical way of carrying out the process of this invention, a liquid is caused to flow into a container or receptacle into which it is desired to feed the solids or semisolids and prior to the entry of the liquid into said container, the solid or semisolid material is commingled with the liquid, the admixed material and liquid flowing together into the container. In practice, liquid may be drawn from the container or from an outside source, or from a condenser supply tank containing a condensate of vapors generated in the container. The use of the condensate, of course, applies only to the feed of material to closed containers in which vapors are being generated.

Features of the invention, other than those specified, will be apparent from the hereinafter detailed description and claims, when read in conjunction with the accompanying drawings.

In the accompanying drawings, I have illustrated, diagrammatically, one form of apparatus by means of which the process of the present invention may be carried out, but it will be understood that the showing therein made is for the purpose of illustration, only, and does not define the limits of the invention. The invention may be practiced in other forms of chemical apparatus and, accordingly, is to be understood as broadly novel as is commensurate with the appended claims.

In the drawings, Figure 1 illustrates, more or less, diagrammatically, a chemical apparatus embodying the present invention.

Figure 1:
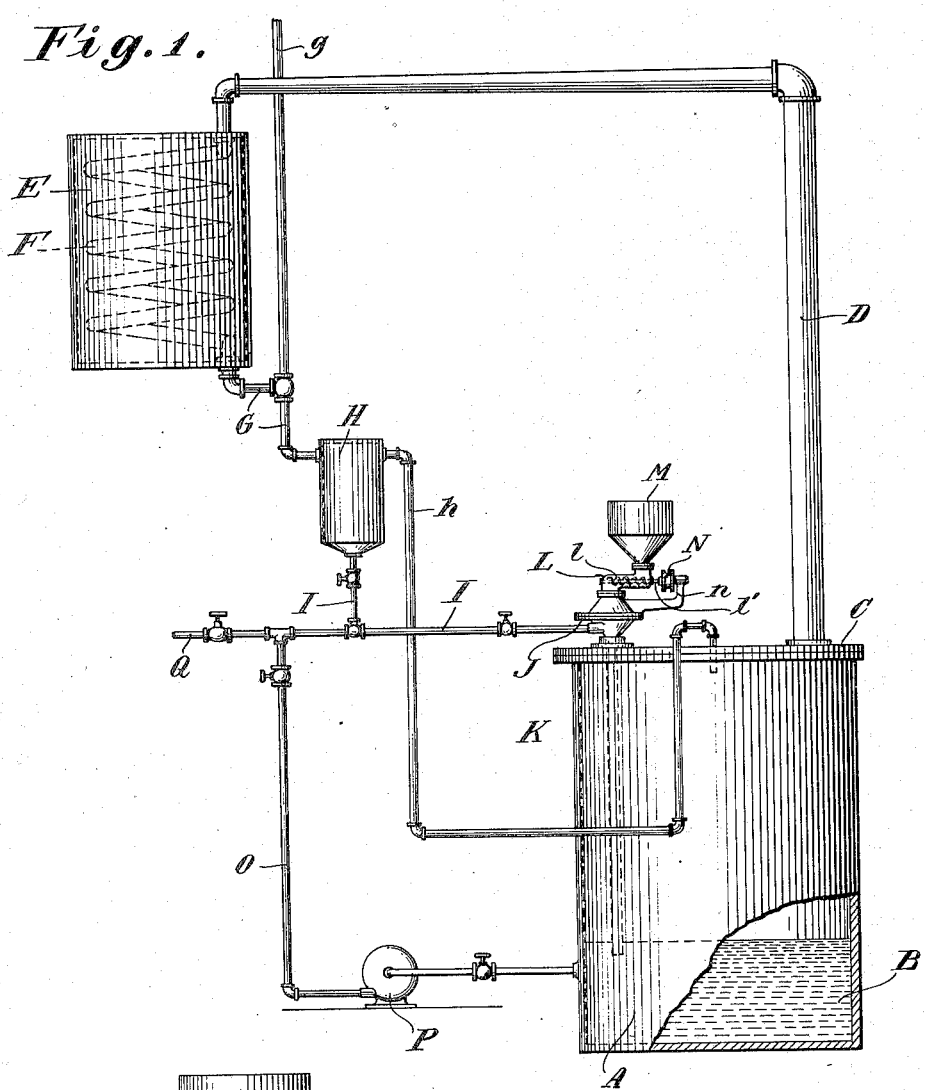
Figure 2:
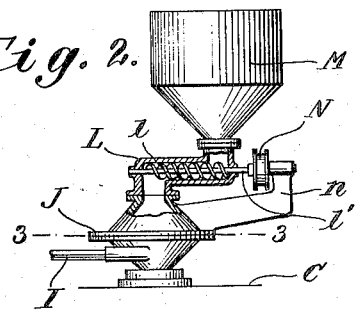
Figure 2 is a detailed section of a portion of the apparatus.

While the present invention is adapted for broad and general application in the chemical arts, I will, for the purpose of illustration, and in the interest of brevity, described the manner in which it may be carried out in a so-called reduction apparatus of the general character hereinbefore described. With this in mind, reference may be had to the drawing, wherein A designates the vessel or digester in which the reduction is carried out.

This vessel is usually in the form of a digester or closed kettle, of convenient shape and proportions, and is adapted to contain a suitable quantity of nitro compound and other ingredients B, under treatment. The top of the kettle is tightly closed by a suitable cover C, so that when the contents of the vessel are heated, in any suitable manner, the escape of vapors arising from the material operated upon, except as provided, may be precluded from unrestricted exit from the vessel. Such vapors, however as are allowed to escape from the confines of the vessel, through pipe D pass to any suitable form of condenser E. This condenser is shown in the drawings as embodying a casing in which is positioned a coil F. A suitable cooling or refrigerating agent, e. g., water or brine, is circulated about the coil for the purpose of condensing the vapors passing therethrough and the resulting condensate is led from the condenser through a pipe G which preferably delivers the condensate into a supply tank H. The pipe G is preferably vented through the employment of a pipe $g$, as shown in the drawing.

The supply tank H is provided with an overflow $h$ leading back to the vessel A. This pipe serves merely to return the condensate into the vessel in case the supply tank overflows, but the normal exit of the condensate from said tank is accomplished through a pipe I which leads from substantially the bottom of the supply tank to a mixing funnel J superimposed on the vessel and in which the iron filings or other solid or semi-solid materal may be commingled with the condensate, or other liquid before said condensate or other liquid is fed into the interior of the vessel.

The mixing and feeding funnel, as shown in the drawing, is preferably formed in two parts, flanged and bolted together and the lower section of which funnel is secured to the cover C of the vessel. The lower section is provided with a hollow tubular stem or pipe K, which extends downwardly into the vessel and preferably terminates below the surface of the contents thereof. It is through this pipe that the condensate, or other liquid, after flowing into the mixing funnel J is caused to enter the vessel. The upper section of the mixing funnel is provided with an opening at its apex and with this opening communicates the outlet end of a screw feed conveyer L, the inlet end of said conveyer being positioned below the delivery end of a hopper M. The screw $l$ of said conveyer is fixed on shaft $l'$, the outer end of which may be journalled in a bracket $n$ carried by the upper section of the mixing funnel. The shaft $l'$ may be rotated by any suitable power means such as a motor or the like, but for the purpose of illustration, I have shown a pulley N fixed on said shaft and adapted to be operated by a belt to impart rotation thereto. In practice, this rotation may be constant or intermittent as desired.

With this construction, it will be apparent that iron filings or other matter deposited in the hopper M will be delivered by the conveyer $l$ to the mixing funnel into which they will fall by gravity. It will be noted, however, from Figure 3 of the drawing, that the pipe I enters the mixing funnel off center and this fact, together with the fact that the liquid enters the mixing funnel under more or less hydrostatic pressure, brings about a swirling action of said condensate within the mixing chamber, the liquid partaking of a pronounced swirling action before entering and descending through the pipe K into the kettle. The iron filings fall from the delivery entrance of the conveyer into the swirling liquid, and, becoming thoroughly commingled therewith, pass with said liquid into the digester. Manifestly, any tendency of the solid or semi-solid matter to adhere to the surface of the funnel is thereby avoided. It will be obvious that mechanical feeding means, other than the screw conveyer described, may be employed for feeding the iron filings or borings in the manner described, the screw feed being, merely, the device which it is preferred to use for this purpose.

The foregoing manner of introducing the solid or semi-solid material into the vessel through the employment of the condensate of vapors generated in the vessel operates with high efficiency in practice, but the present invention is not limited to this precise manner of introducing such solids or semi-solids. In practice, this may be accomplished by liquids other than the condensate, and the apparatus shown in the drawings is so constituted as to permit of the other forms of introduction. To this end, a pipe O may lead from a point below the surface of the liquid in the vessel to the pipe I and a pump P, of any suitable form, may be included in the pipe O for the purpose of drawing liquid from within the vessel and feeding it to the mixing chamber J. In this instance, the solids or semi-solids are carried into the vessel by liquid drawn therefrom by the pump P.

Figure 3:
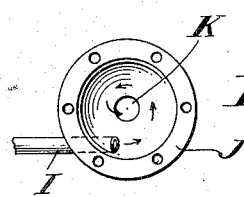
Figure 3 is a section on line 3—3 of Figure 2.

Moreover, liquid for feeding the solids or semi-solids into the vessel may be led from an outside source through a pipe Q, which is shown as jointed into the pipe O. The several pipes of the apparatus are suitably valved so that the liquid may be fed through either of the several pipes referred to, i. e., the condensate from a tank H through the pipe I to the mixing chamber, through the pipes O and I to the mixing chamber, or through the pipes Q and I to the mixing chamber. In the first instance, the condensate is fed, in the second instance, the liquid from the vessel is drawn therefrom and returned thereto through the mixing chamber, and in the third instance, the liquid circulated through the mixing chamber comes from an outside source. Furthermore, the pipe I may lead into the mixing chamber otherwise than off center as shown in Fig. 3.

Having thus fully described the invention, what I claim as new and desire to secure by Letters Patent is:

1. The process of feeding solid or semi-solid material into a treating receptacle in which vapor is being generated, which consists in leading off vapor from the receptacle condensing the vapor, causing the condensate to flow back into the receptacle, and introducing the material into the path of the condensate so that it is commingled with the condensate and carried thereby into the receptacle.

2. The method of feeding solid or semi-solid material to a closed treating receptacle in which vapor is being generated, which consists in leading off vapor from the receptacle, condensing the same, mechanically commingling the material with said condensate, and thereafter allowing the mechanically admixed material and condensate to flow into the treating receptacle.

3. The process of feeding solid or semi-solid materials into a treating receptacle which consists in causing liquid to flow into a downwardly tapering bowl to enter the bowl tangentially and partake of a swirling action therein, introducing the material into the swirling liquid so that said material is commingled with the liquid, and thereafter causing the commingled liquid and material to flow from the base of the bowl into the receptacle, while precluding the escape of fumes from the treating receptacle to the atmosphere.

4. The process of feeding solid or semi-solid material into a treating receptacle which consists in causing liquid to flow with a swirling action through a mixing chamber and thence into the receptacle and causing the materials to be introduced to fall into the mixing chamber by gravity and into the swirling liquid to be commingled therewith and pass with the liquid into the receptacle, while precluding the escape of fumes from the treating receptacle to the atmosphere.

In testimony whereof, I have signed my name to this specification.

GEORGE A. BERRY.